US006757546B1

(12) United States Patent
Hagen et al.

(10) Patent No.: US 6,757,546 B1
(45) Date of Patent: Jun. 29, 2004

(54) SYNCHRONIZATION METHOD AND APPARATUS FOR MULTI-PLATFORM COMMUNICATION SYSTEM

(75) Inventors: Frank A. Hagen, Palos Verdes Estates, CA (US); Kar W. Yung, Torrance, CA (US); Ying Feria, Manhattan Beach, CA (US); Donald C. D. Chang, Thousand Oaks, CA (US)

(73) Assignee: The Directv Group, Inc., El Segundo, CA (US)

( * ) Notice: Subject to any disclaimer, the term of this patent is extended or adjusted under 35 U.S.C. 154(b) by 621 days.

(21) Appl. No.: 09/644,225

(22) Filed: Aug. 21, 2000

Related U.S. Application Data (63) Continuation-in-part of application No. 09/271,997, filed on Mar. 18, 1999.

(51) Int. Cl.[7] .............................................. H04B 15/00
(52) U.S. Cl. ..................... 455/502; 455/13.2; 455/12.1; 455/11.1; 455/3.01; 370/315; 370/316; 370/324; 370/320; 370/321; 370/319; 375/145; 375/140
(58) Field of Search ................................ 455/502, 13.2, 455/12.1, 11.1, 3.01; 370/315, 316, 324, 320, 321, 319; 375/145, 140

(56) References Cited

U.S. PATENT DOCUMENTS

| | | | | |
|---|---|---|---|---|
| 2,470,787 | A | 5/1949 | Nosker | 342/12 |
| 3,384,891 | A | 5/1968 | Anderson | 342/357 |
| 3,544,995 | A | 12/1970 | Bottenberg et al. | 342/46 |
| 4,161,730 | A | 7/1979 | Anderson | 342/352 |
| 4,161,734 | A | 7/1979 | Anderson | 342/352 |
| 4,359,733 | A | 11/1982 | O'Neill | 343/6.5 |
| 4,613,864 | A | 9/1986 | Hofgen | 343/357 |
| 4,819,227 | A | 4/1989 | Rosen | 370/75 |

(List continued on next page.)

FOREIGN PATENT DOCUMENTS

| | | |
|---|---|---|
| EP | 0 335 558 | 4/1989 |
| EP | 0682 416 A2 | 11/1995 |
| EP | 0 749 252 A | 12/1996 |
| EP | 0776 099 A2 | 5/1997 |
| EP | 0 837 568 A2 | 4/1998 |
| EP | 0 845 874 A2 | 6/1998 |
| EP | 0 860 708 A | 8/1998 |
| EP | 0 860 709 A | 8/1998 |
| EP | 0 860 710 A2 | 8/1998 |

(List continued on next page.)

OTHER PUBLICATIONS

K. K. Chan, F. Marcoux, M. Forest, L. Martins–Camelo, "A Circularly Polarized Waveguide Array for Leo Satellite Communications", pp. 154–157, IEEE1999 AP–S International Symposium, Jun. 1999.

(List continued on next page.)

*Primary Examiner*—William Trost
*Assistant Examiner*—Danh C Le
(74) *Attorney, Agent, or Firm*—Georgann S. Grunebach; John A. Crook, III (57) ABSTRACT

A mobile wireless communications system including a plurality of individual transponding nodes of various types, all in communication with a central processing hub. A local user signal is processed by the central processing hub and radiated through multiple paths to a plurality of the plurality of individual transponding platforms simultaneously. The signal is then re-radiated by each of the plurality of the plurality of individual transponding platforms to a mobile terminal that receives the re-radiated signal from the plurality of the plurality of individual transponding platforms coherently and in phase. The central hub synchronizes both the signals received and transmitted from each user through one or more of the transponding nodes. This synchronization is such that the relative arrival time of the PN encoded data in the user signals is synchronized to within a fraction of a chip in both the forward and return links. The central hub also synchronizes the carrier phase of the user signals to within a fraction of a wavelength in both the forward and return links.

20 Claims, 5 Drawing Sheets

U.S. PATENT DOCUMENTS

| | | | |
|---|---|---|---|
| 4,823,341 A | 4/1989 | Rosen | |
| 4,897,661 A | 1/1990 | Hiraiwa | 342/457 |
| 4,994,809 A | 2/1991 | Yung et al. | 342/108 |
| 5,006,855 A | 4/1991 | Braff | 342/357 |
| 5,097,269 A | 3/1992 | Takayama et al. | |
| 5,099,245 A | 3/1992 | Sagey | 342/357 |
| 5,111,209 A | 5/1992 | Toriyama | 342/357 |
| 5,126,748 A | 6/1992 | Ames et al. | 342/353 |
| 5,181,041 A | 1/1993 | Lind et al. | |
| 5,187,485 A | 2/1993 | Tsui et al. | |
| 5,233,626 A | 8/1993 | Ames | 375/1 |
| 5,245,612 A * | 9/1993 | Kachi et al. | 370/324 |
| 5,278,863 A | 1/1994 | Briskman | |
| 5,319,673 A | 6/1994 | Briskman | 375/1 |
| 5,327,455 A | 7/1994 | De Gaudenzi et al. | |
| 5,365,447 A | 11/1994 | Dennis | |
| 5,379,320 A | 1/1995 | Fernandes et al. | |
| 5,387,916 A | 2/1995 | Cohn | 342/44 |
| 5,410,314 A | 4/1995 | Frush et al. | 342/26 |
| 5,423,059 A | 6/1995 | LoGalbo et al. | |
| 5,444,450 A | 8/1995 | Olds et al. | 342/357 |
| 5,467,282 A | 11/1995 | Dennis | |
| 5,485,485 A | 1/1996 | Briskman et al. | 375/200 |
| 5,525,995 A | 6/1996 | Benner | 342/90 |
| 5,550,809 A | 8/1996 | Bottomley et al. | |
| 5,592,471 A | 1/1997 | Briskman | 455/52.3 |
| 5,592,481 A | 1/1997 | Wiedeman et al. | |
| 5,644,572 A | 7/1997 | Olds et al. | 370/324 |
| 5,739,785 A | 4/1998 | Allison et al. | 342/357 |
| 5,764,188 A | 6/1998 | Ghosh et al. | |
| 5,839,053 A | 11/1998 | Bosch et al. | |
| 5,856,804 A | 1/1999 | Turcotte et al. | |
| 5,864,579 A | 1/1999 | Briskman | 375/200 |
| 5,867,109 A | 2/1999 | Wiedeman | |
| 5,903,549 A | 5/1999 | von der Embse et al. | |
| 5,907,813 A | 5/1999 | Johnson, Jr. et al. | |
| 5,909,460 A | 6/1999 | Dent | |
| 5,917,447 A | 6/1999 | Wang et al. | |
| 5,918,157 A | 6/1999 | Wiedeman et al. | |
| 5,920,284 A | 7/1999 | Victor | 342/357.01 |
| 5,944,770 A | 8/1999 | Enge et al. | 701/707 |
| 5,945,948 A | 8/1999 | Buford et al. | 342/457 |
| 5,949,766 A | 9/1999 | Ibanez-Meier et al. | |
| 5,956,619 A | 9/1999 | Gallagher et al. | |
| 5,969,674 A | 10/1999 | Von der Embse et al. | 342/357.17 |
| 5,974,039 A | 10/1999 | Schilling | |
| 5,991,329 A | 11/1999 | Lomp et al. | |
| 6,016,124 A | 1/2000 | Lo et al. | |
| 6,028,884 A | 2/2000 | Silberger et al. | |
| 6,040,798 A | 3/2000 | Kinal et al. | |
| 6,067,442 A * | 5/2000 | Wiedeman et al. | 455/13.1 |
| 6,084,510 A | 7/2000 | Lemelson et al. | |
| 6,119,016 A | 9/2000 | Matusevich | |
| 6,138,012 A | 10/2000 | Krutz et al. | 455/427 |
| 6,151,308 A | 11/2000 | Ibanez-Meier et al. | |
| 6,160,994 A | 12/2000 | Wiedeman | |
| 6,167,263 A | 12/2000 | Campbell | |
| 6,195,555 B1 | 2/2001 | Dent | |
| 6,205,320 B1 | 3/2001 | Coleman | |
| 6,208,626 B1 | 3/2001 | Brewer | |
| 6,229,477 B1 | 5/2001 | Chang et al. | |
| 6,243,587 B1 | 6/2001 | Dent et al. | |
| 6,246,363 B1 | 6/2001 | Yung et al. | |
| 6,266,533 B1 | 7/2001 | Zadeh et al. | |
| 6,289,211 B1 | 9/2001 | Koorapaty et al. | |
| 6,295,440 B2 | 9/2001 | Chang et al. | |
| 6,298,238 B1 | 10/2001 | Dai | |
| 6,301,231 B1 | 10/2001 | Hassan et al. | |
| 6,313,790 B2 | 11/2001 | Chang et al. | |
| 6,314,269 B1 | 11/2001 | Hart et al. | |
| 6,337,980 B1 | 1/2002 | Chang et al. | |
| 6,339,611 B1 | 1/2002 | Antonio et al. | |
| 6,340,947 B1 | 1/2002 | Chang et al. | |
| 6,374,080 B2 | 4/2002 | Uchida | |
| 6,377,208 B2 | 4/2002 | Chang et al. | |
| 6,380,893 B1 | 4/2002 | Chang et al. | |
| 6,381,228 B1 | 4/2002 | Prieto, Jr. et al. | |
| 6,396,819 B1 | 5/2002 | Fleeter et al. | |
| 6,418,158 B1 * | 7/2002 | Vishwanath et al. | 375/139 |
| 6,430,394 B1 * | 8/2002 | Boyden | 455/13.4 |
| 6,452,541 B1 * | 9/2002 | Zhao et al. | 342/357.06 |
| 6,452,962 B1 | 9/2002 | Linsky et al. | |
| 6,466,554 B2 * | 10/2002 | Okada | 370/312 |
| 6,480,788 B2 | 11/2002 | Kilfeather et al. | |
| 6,507,314 B2 | 1/2003 | Chang et al. | |
| 6,563,457 B2 | 5/2003 | Chang et al. | |
| 6,591,111 B1 * | 7/2003 | Stosz et al. | 455/518 |
| 2001/0000167 A1 | 4/2001 | Chang et al. | |
| 2001/0045903 A1 | 11/2001 | Chang et al. | |
| 2001/0048389 A1 | 12/2001 | Nakagawa | |
| 2002/0014062 A1 | 2/2002 | Chang et al. | |
| 2002/0053987 A1 | 5/2002 | Chang et al. | |
| 2002/0072332 A1 | 6/2002 | Chang et al. | |
| 2002/0072360 A1 | 6/2002 | Chang et al. | |
| 2002/0072361 A1 | 6/2002 | Knoblach et al. | |
| 2002/0072374 A1 | 6/2002 | Chang et al. | |
| 2002/0073437 A1 | 6/2002 | Chang et al. | |
| 2002/0081969 A1 | 6/2002 | Chang et al. | |
| 2002/0107034 A1 | 8/2002 | Chang et al. | |
| 2002/0118654 A1 | 8/2002 | Chang et al. | |
| 2002/0128044 A1 | 9/2002 | Chang et al. | |
| 2002/0128045 A1 | 9/2002 | Chang et al. | |
| 2002/0146058 A1 | 10/2002 | Feria et al. | |
| 2002/0150067 A1 | 10/2002 | Feria et al. | |
| 2003/0076258 A1 | 4/2003 | Chang et al. | |

FOREIGN PATENT DOCUMENTS

| | | |
|---|---|---|
| EP | 0 860 952 A | 8/1998 |
| EP | 1 010 988 A2 | 6/2000 |
| EP | 1 037 403 A2 | 9/2000 |
| EP | 1 139 583 A2 | 10/2001 |
| EP | 1 148 662 A2 | 10/2001 |
| EP | 1 158 698 A2 | 11/2001 |
| EP | 1 161 001 A2 | 12/2001 |
| GB | 2 271 902 A | 10/1993 |
| GB | 2 306 827 A | 5/1997 |
| JP | 2-28580 | 1/1990 |
| JP | 3-291584 | 12/1991 |
| JP | 4-27887 | 1/1992 |
| JP | 07146995 A | 6/1995 |
| JP | 08015405 A | 1/1996 |
| JP | 09026328 | 1/1997 |
| JP | 09113600 A | 5/1997 |
| JP | 10090391 A | 4/1998 |
| JP | 10-209939 | 8/1998 |
| JP | 11-8579 | 1/1999 |
| JP | 20011345747 A | 12/2001 |
| WO | WO 90/13186 | 11/1990 |
| WO | WO 95/04407 | 2/1995 |
| WO | WO 96/22661 | 7/1996 |
| WO | WO 9851568 A | 11/1998 |
| WO | WO 01/91310 A3 | 11/2001 |
| WO | WO 01/93458 A2 | 12/2001 |
| WO | WO 01/94969 A3 | 12/2001 |
| WO | WO 01/95522 A1 | 12/2001 |
| WO | WO 02/058186 A2 | 7/2002 |
| WO | WO 02/058273 A2 | 7/2002 |

OTHER PUBLICATIONS

M. Oodo, R. Miura, Y. Hase, "Onboard DBF Antenna for Stratospheric Platform", pp. 125–128, IEEE Conference on Phased Array Systems and Technology, California, May 21–25, 2000.
Yokosuka Research Park, "The First Stratospheric Platform Systems Workshop", pp 1–216, May 12–13, 1999.
Teles J et al.:"Overview of TDRSS" Orbit Determination and Analysis. PSD Meeting, Cospar Technical Panel on Satellite Dynamics, $13^{th}$ Cospar Scientific Assembly, Hamburg, Germany, Jul. 11–21, 1994, Advances in Space Research, pp. 67–76.
Bricker, P et al.: "Integrated Receiver for NASA Tracking and Data Relay Satellite System", MILCOM 90. A new Era, 1990 IEEE Military Communications Conference, Monterey, CA, USA, Sep. 30–Oct. 3, 1990, p. 1–5.
Dunham, J B, et al.: "Onboard Orbit Estimation with Tracking and Data Relay Satellite System Data", Journal of Guidance, Control, and Dynamics, Jul.–Aug. 1983, USA, vol. 6 NR.4, pp. 292–301.
K. H. Bethke, "A Novel Noncooperative Near–Range Radar Network or Traffic Guidance and Control on Airport Surfaces", IEEE Transactions on Control Systems Technology, vol. 1, No. 3, Sep. 1993.
Doc 9524 FANS/4–WP/76, International Civil Aviation Organization, Special Committee on Future Air Navigation Systems, Fourth Meeting, Montreal, May 2–20, 1988, Report, pp. 3.2B–2 & 3.2B–3.
U.S. patent application Ser. No. 09/576,652, Hagen et al., filed May 22, 2000.
U.S. patent application Ser. No. 09/584,012, Chang et al., filed May 30, 2000.
U.S. patent application Ser. No. 09/576,648, Yung et al., filed May 22, 2000.
U.S. patent application Ser. No. 09/587,960, Yung et al., filed Jun. 6, 2000.
U.S. patent application Ser. No. 09/587,960, Yung et al. filed Jun. 6, 2000.
U.S. patent application Ser. No. 09/271,997, Chang et al., filed Mar. 18, 1999.
U.S. patent application Ser. No. 09/209,062, Yung et al., filed Dec. 10, 1998.
U.S. patent application Ser. No. 09/550,505, Chang et al., filed Apr. 17, 2000.
U.S. patent application Ser. No. 08/803,937, Chang et al., filed Feb. 21, 1997.
U.S. patent application Ser. No. 09/669,095, Yung et al., filed Sep. 5, 2000.
U.S. patent application Ser. No. 09/655,498, Chang et al., filed Sep. 5, 2000.
Suzuki, R. et. al, :Mobile TDM/TDMA System with Active Array Antenna, Global Telecommunications Conference, 1991; Globecom '91, vol. 3, Dec. 2–5, 1991, pp. 1569–1573.
Chiba, Isamu et. al, "Digital Beam Forming (DBF) Antenna System for Mobile Communications", IEEE AES Systems Magazine, Sep. 1997, pp. 31–41.
Miura, Ryu et. al, "A DBF Self–Beam Steering Array Antenna for Mobile Satellite Applications Using Beam–Space Maximal–Ratio Combination", IEEE Trans. On Vehicular Technology, vol. 48, No. 3, May 1999, pp. 665–675.
Sato, Kazuo et al., "Development and Field Experiments of Phased Array Antenna for Land Vehicle Satellite Communications", IEEE Antennas and Propagation Society International Symposium, 1992, Jul. 1992, pp. 1073–1076.
Sakakibara, Kunio et. al, "A Two–Beam Slotted Leaky Waveguide Array for Mobile Reception of Dual–Polarization DBS", IEEE Transactions on Vehicular Technology, vol. 48, No. 1, Jan. 1999, pp. 1–7.
Colella, Nicholas J. et al., "The HALO Network™", IEEE Communications Magazine, Jun. 2000, pp. 142–148.
Colella, Nicholas J. et al., "High Speed Internet Acess via Stratospheric HALO Aircraft", INET 99 Proceedings, Internet Society, Technology, Wireless, 13 pages, Jun.

* cited by examiner

SYNCHRONIZATION METHOD AND APPARATUS FOR MULTI-PLATFORM COMMUNICATION SYSTEM

CROSS-REFERENCE TO RELATED APPLICATIONS

The present application is a continuation-in-part of assignee's co-pending U.S. Ser. No. 09/271,997, entitled "Multiple Satellite Mobile Communications Method and Apparatus for Hand-Held Terminals," filed on Mar. 18, 1999.

TECHNICAL FIELD

The present invention relates generally to a wireless communication system. More specifically, the present invention relates to a synchronization technique for a multi-platform wireless communication system that provides for the delivery of signals to an intended recipient coherently and completely in-phase.

BACKGROUND ART

Current mobile satellite communication systems, such as Iridium, Globalstar, and ICO, utilize low-cost user terminals as one of their key system features. To maintain communications linkage with these current mobile systems, the system satellites provide multiple beam and high-gain services to the subscribers. The low-cost and low-gain hand-held terminals utilized by the users of these systems, transmit and receive signals to and from high performance satellites which populate almost the entire hemisphere. Some of these current systems require access to at least two satellites to assure a soft hand-over process as the satellites progress from horizon to horizon. As a result, the satellite system becomes more reliable and available as more satellites come into a user's field of view (FOV). The satellite constellations provided by these current systems are thus sized to guarantee a minimum number of satellites within a user's FOV over large coverage areas at all times.

All of these current mobile satellite communication systems, however, suffer from certain disadvantages. First, they all have limited frequency (the term "frequency" is generalized herein to refer to frequency, time slot or CDMA code) resources. Any given frequency over a given ground position can only be utilized by one user at a time. Thus, if one user accesses a satellite using a particular frequency slot to communicate to his counterpart on network, other satellites and/or users in the same region cannot reuse the same frequency resource in the same local area. In particular, if a nearby secondary user has a handset that requires the same frequency resources as is being utilized by the first user, the second user is unable to access the system, even via different satellites. This is true regardless of the sophistication of the system, including systems that utilize multiple beam satellite designs. Even when multiple satellites are available at a given geographic location, the same frequency spectrum cannot be used by more than one user in a local area. The availability of multiple satellites merely serves to increase the availability of the system to the user. However, the total capacity of these mobile communication satellite systems is still limited by their inefficient usage of the available frequency resources. Thus, the potential growth of these current satellite communication systems is inherently limited.

Additionally, current telecommunications systems generally allow only mobile-to-hub and hub-to-mobile communications in most low earth orbit and medium earth orbit mobile satellite constellations. Mobile-to-mobile linkages require multiple hops between hubs. This means that two or more frequency resources must be committed by the system to close the links.

It is clearly desirable to provide a mobile communication satellite system that relaxes the above constraints, and more efficiently utilizes current mobile satellite communication system resources, while also providing much greater opportunity for system growth.

SUMMARY OF THE INVENTION

It is an object of the present invention to provide a wireless communication system with reduced limitations on frequency re-use for point-to-point communications.

It is another object of the present invention to provide a wireless communication system that utilizes individual transponders and mobile terminals that are relatively simple and of low complexity.

It is a further object of the present invention to provide a wireless communication system with high system reliability through graceful degradation.

It is still another object of the present invention to provide a multi-transponder wireless communication system that allows flexible combination of user types.

It is a related object of the present invention to provide a multi-transponder wireless communication system with better utilization of total system resources.

It is yet a further object of the present invention to provide a synchronization process for user signals in multi-platform applications.

In accordance with the above and other objects of the present invention, a multi-platform wireless communication system is provided. The wireless communication system includes a plurality of individual communication transponding nodes. The plurality of individual transponding nodes are each in communication with a ground hub such that a signal processed by the ground hub in the forward link is radiated with compensating time delays to one or more of the plurality of individual transponders. The radiated signals are then re-radiated by the plurality of individual transponders and coherently received and processed by a mobile user terminal. The return link signal path is the reverse of the forward link.

In accordance with another object of the present invention, a method for synchronizing user signals such that they arrive at the location of an intended recipient in-phase is provided. The system includes a plurality of individual transponding nodes and a plurality of mobile users each having a respective mobile terminal. A ground hub establishes a link between at least one of the mobile terminals through one or more of the plurality of transponding nodes. A plurality of user signals are transferred to and from the central hub. The central hub synchronizes the relative arrival of PN encoded data in the user signals to within a fraction of a chip in both a forward link and a return link. The central hub synchronizes the carrier phase of said user signals to within a fraction of a wavelength in both the forward and return links.

In accordance with yet another object of the present invention, the system includes a plurality of individual transponding nodes. The system also includes a plurality of individual resource cells, each associated with a particular one of the plurality of individual transponding nodes and a particular one of the plurality of available codes. The system further includes a plurality of mobile terminals of different types, each of which is assigned to operate in one or more of the plurality of individual resource cells.

These and other features of the present invention will become apparent from the following description of the invention, when viewed in accordance with the accompanying drawings and appended claims.

BEST MODE(S) FOR CARRYING OUT THE INVENTION

Referring now to the figures, the disclosed mobile communication system can be utilized to break away from the frequency spectrum limitation discussed above and provide much more efficient means to re-use the allocated mobile satellite and wireless spectrum multiple times. By eliminating this frequency spectrum limitation on the operation of multiple satellites, the overall capacity of existing mobile satellite and wireless communication systems can more readily expand.

Figure 1:
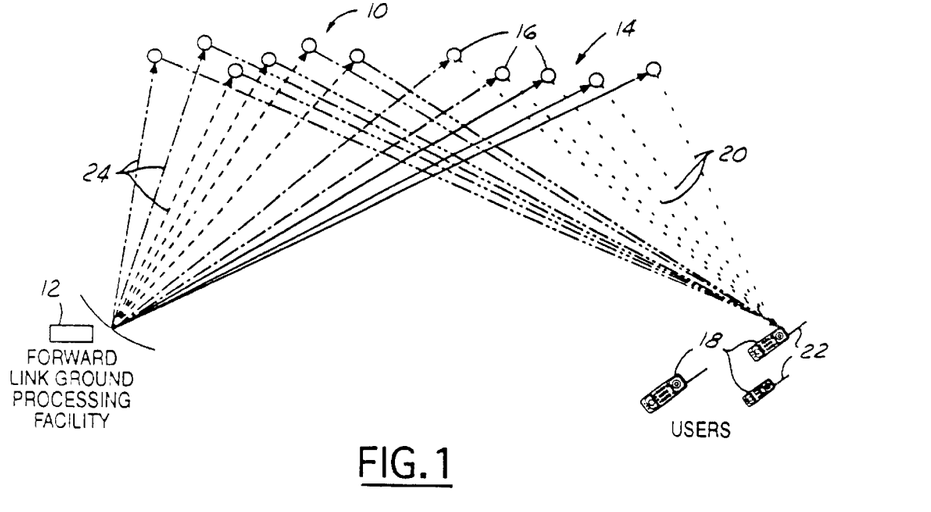
FIG. 1 is a schematic illustration of the forward link geometry of a mobile satellite communications system in accordance with the present invention.

Referring now to FIG. 1, a mobile satellite communication system 10 in accordance with a preferred embodiment of the present invention is illustrated. In FIG. 1, the mobile satellite communications system 10 is illustrated in a forward link mode. The mobile satellite communications system 10 includes a ground telecommunications hub 12, a satellite constellation 14 including a plurality of individual satellites 16, and a plurality of hand-held user terminals 18 such as mobile phones. As discussed in more detail below, the user terminals 18 can receive signals 20 simultaneously from multiple satellites 16 via their broad beam antennas 22. The ground telecommunications hub 12 is in communication with all of the satellites 16 in the satellite constellation 14 individually and simultaneously. The hub 12 also preprocesses user signals to compensate for path differentials before sending radiated signals 24 to the satellites 16, as discussed in more detail below.

In accordance with the preferred embodiment, the design of the individual satellites 14 can be significantly simplified over those utilized in prior mobile systems because the satellite constellation 14 functions as a sparse radiating array. It is known that the more satellites 16 that are included in a satellite constellation 14, the better the performance the mobile satellite communications system 10 will achieve. Satellites that are simple, small, and provide high performance are preferable. This is because the performance of the system 10 depends more heavily on the satellite constellation 14 than on the individual satellites 16.

In a transmit mode, shown in FIG. 1, the individual satellites 16 radiate modulated RF power to a chosen field of view ("FOV"). The system 10 is still operable with reduced capacity and no reconfiguration even if one individual satellite 16 is lost for any reason. As a result, the system 10 features graceful degradation characteristics and provides very high reliability and availability. Most of the complexity of the system 10 is located in the ground hubs 12, which locate and track the potential users and perform the major functions of beamforming and filtering, as discussed below.

Figure 2:
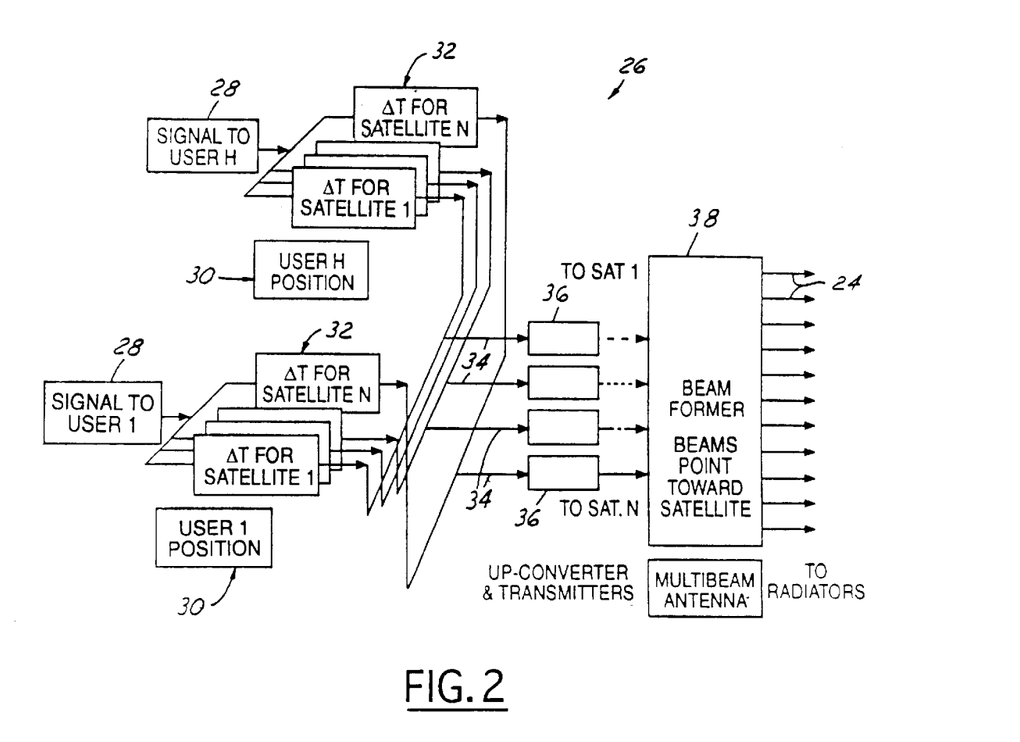
FIG. 2 is a schematic block diagram illustrating the signal transmission function of a ground telecommunications hub for a wireless communications system in accordance with a preferred embodiment of the present invention.

As shown in FIG. 2, the processing performed at the ground telecommunications hub 12 is diagrammatically illustrated. The hub 12 tracks, updates, and forward predicts the time variant differential information among various paths between the hub 12 and the intended user terminals 18. The accuracy of this information must be within a tenth of an RF wavelength. For UHF satellite systems, the required path differential accuracy is preferably about ten (10) centimeters. For L and S band mobile satellite constellations, the accuracy must be on the order of one (1) centimeter. Unfortunately, the conventional or GPS techniques are not able to provide the required accuracy.

In accordance with the present invention, the required accuracy of the equivalent path differentials, including all propagation distortion, can be provided using two-way active calibration and R2N (two-way ranging navigation) techniques. An R2N technique is just one technique for obtaining positioning information by which to locate the positioning of the satellites and users precisely using multiple calibration sites and is described in co-pending U.S. patent application Ser. No. 09/209,062, entitled "Method and System for Determining a Position of a Transceiver Unit Incorporating Two-Way Ranging Navigation as a Calibration Reference for GPS," and filed on Dec. 10, 1998. Other known techniques may also be utilized.

The ground telecommunications hub 12 has a processing center 26 that processes each signal and is shown in a transmit mode in FIG. 2. The hub 12 has the capability to address the plurality of satellites 16 individually through the use of antenna spatial discrimination to provide separate signals to different satellites. Alternatively, code identification can also be used to address different satellites independently.

As shown in FIG. 2, assuming that there are "H" users, the signals from user 1 to user H, identified generally by reference number 28, are input into the processing center 26. The position of the various users (1 to H), are determined generally by the circuitry from the various user signals 28, designated by reference number 30. The various user signals 28 for user 1 to user H are then combined for transmission to the different satellites 16, as generally indicated by reference number 32. In this case, the signal is sent to N satellites. The combined signals are then amplified, filtered, up converted, and then further amplified, as generally indicated by reference number 36. These signals are then delivered to a multiple beam antenna 38 where beam-forming processing is done so that the signals can be transmitted to the N satellites via radiating signals 24. The beam-forming process can be done in baseband or a low IF frequency band by either digital or analog means. For a low bandwidth (less than a few MHz signals), digital implementation can provide cost advantages. The processed signal 24, radiated from the ground hub 12 to each satellite, is amplified, filtered, and then re-radiated by each of the multiple satellites 16 to arrive at a designated user location simultaneously. Consequently, the radiated signals from the multiple satellites will be received coherently by a simple hand held terminal 22.

Equivalently, the effect of the spatial processing performed by the processing center 26 is to focus signal strength on the user from multiple satellites 16, which act like sparsely separated portions of a large active reflector.

Therefore, the processing on the ground will insert different time delays into the signals 24 which are radiated via various paths. The time delays will be inserted into the signals 24 as if the satellites were located on an ellipsoidal surface, of which the two foci are located exactly at the hub 12 and the designated user 18 positions respectively. In low and middle earth orbit constellations, the users 18 and the hub 12 will always be in the near field of the sparse array.

Figure 3:
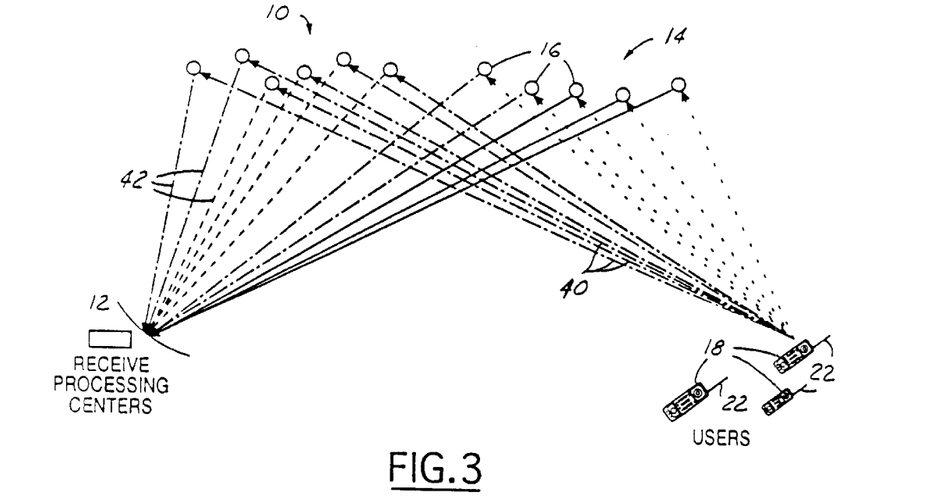
FIG. 3 is a schematic illustration of the return link geometry of a wireless communications system in accordance with a preferred embodiment of the present invention.

In a receive mode, shown in FIG. 3, the individual satellites 16 collect RF signals from the same FOV. FIG. 3 illustrates the return link geometry for receiving signals sent from the user terminals 18 to the ground telecommunications hub 12. As shown in FIG. 3, there are two groups of links involved: the links between users 18 and the satellites 16, generally indicated by reference number 40, and those between the satellites 16 and the hub 12, as generally indicated by reference number 42. For best performance, the user antennas 22 preferably are able to illuminate all the satellites 16 involved. This will lead to a constraint on the variation of the gain of the user antenna 22 over the cluster.

As with the forward link geometry, the satellites 16 will amplify the signals 40 received from the users 18 and re-radiate the signals 42 toward the hub 12. The hub 12 can receive signals 42 independently, but simultaneously from the satellites 16, and will add the signals 42 from different satellites coherently in the post-processor 44 as illustrated in FIG. 4.

Figure 4:
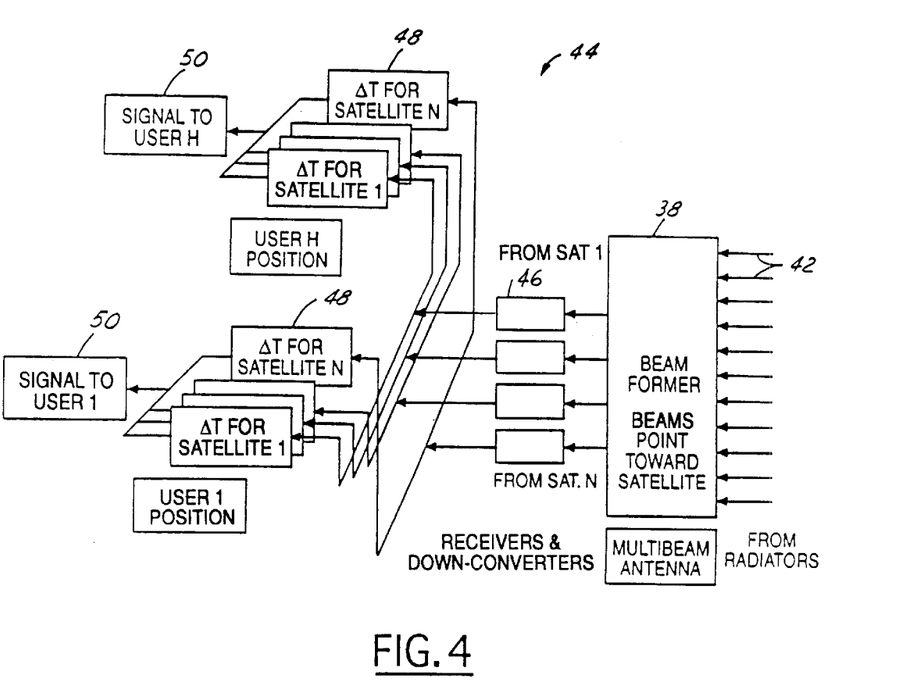
FIG. 4 is a schematic block diagram illustrating the signal receive function of a ground telecommunications hub for a wireless communications system in accordance with a preferred embodiment of the present invention.

The signal flows on the block diagram shown in FIG. 4 illustrate the receive function of the post-processor 40 and the hub 12. The signal flows are reversed from the corresponding ones in FIG. 2. Therefore the receive process will not be reiterated in detail. However, the links 42 from the satellites 16 to the hub 12 are received at the beamformer 38 and then transferred to the receiver and down converters 46 before the signals are separated. The signals are separated depending upon the user from which they are received, as generally indicated by reference number 48, and then sent to the specific user 1 through H, as generally indicated by reference number 50. It should be understood that both the receive and transmit function are a necessary part of the pathlink calibration and user positioning.

The technique of the present invention has been demonstrated to significantly reduce the average side lobe levels. It has been determined that this is due to three factors. First, the proposed architecture is not a periodic array, but rather a randomly spaced sparse array, which has no grating lobes. Although the average side lobe level at a single frequency is relatively high, the level decreases with increasing bandwidth. Second, the large sparsely filled array formed by moving satellites is a large extended aperture size. Thus, all of the users on the ground are in the near field of the extended aperture and the wave fronts received by all users are spherical instead of planar. Consequently, dispersion effects become much more pronounced than would be the case in the far field. The dispersion grows very fast as a probe is scanned away from the main beam and the dispersion smears the power distribution very effectively over a finite signal bandwidth. Third, the communication system is preferably designed with a large frequency bandwidth spectrum. The information signal will therefore be spread over this bandwidth via CDMA or through short duration waveforms for TDMA schemes.

Figure 5:
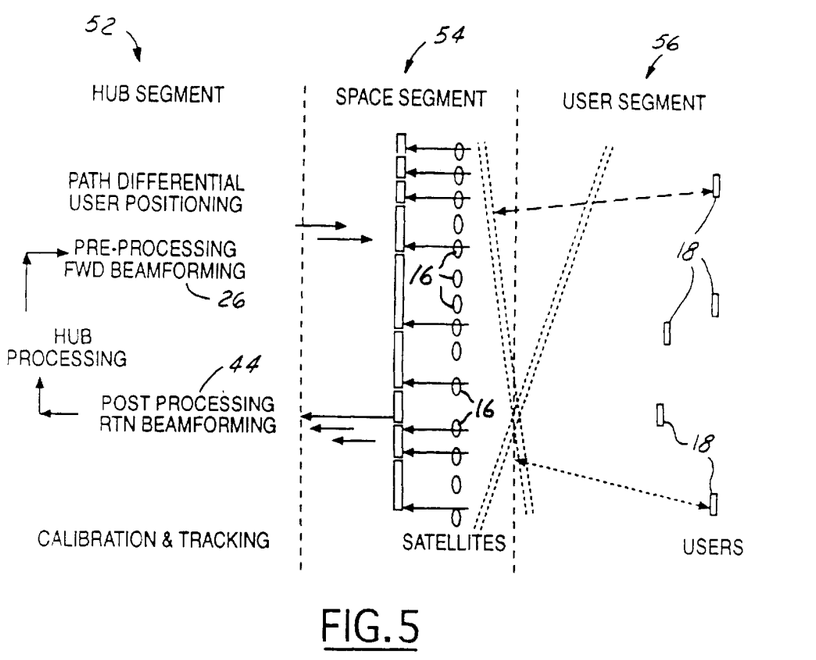
FIG. 5 is a schematic flow diagram illustrating the overall architecture for a wireless communications system in accordance with a preferred embodiment of the present invention.

FIG. 5 illustrates diagrammatically the operation of the invention, which allows for the increased re-use of precious frequency spectrum by multiple satellites. The advantages provided by this system include no limitation on frequency re-use by additional satellites for point-to-point communications. Rather, the capacity of this system is only limited by total satellite RF power. Further, the preferred embodiment allows for the use of simple and low cost satellite designs, because the more satellites included in the constellation, the better the performance of the overall system. The system also provides high system reliability through graceful degradation, as well as concentrating complex processing at the hubs.

The preferred embodiment creates demand for a large number of low cost satellites and also uses R2N techniques to perform satellite and user positioning. The more users using this system, the more accurately the satellite and user positions can be determined. However, even more important than the actual positions of the users and satellites are the path lengths traversed by the signals. Therefore, periodic calibration techniques applied directly to those path lengths may be much simpler and more cost effective. Further, the system also benefits from large percentage bandwidths available with CDMA and TDMA systems.

As shown in FIG. 5, the present invention is divided up into three segments: a hub segment 52 containing the ground telecommunications hub 12, a space segment 54 containing a plurality of individual satellites 16, and a user segment 56, having a plurality of user terminals 18. The hub segment also has a processing center 26 and a post-processor 44 for processing the received and transmitted signals.

The user terminals 18 receive and transmit signals simultaneously from/to multiple satellites 16 via their broad beam antennas. The user terminals 18 do not require any capability to separately address the individual satellites 16 of the space segment 54. The hub 12 maintains links with each of the satellites 16 in the space segment 54 individually and simultaneously. The hub 12 pre-processes the signals intended for each remote user on transmission and post-processes the signals supplied to each local user on reception to compensate for path differentials. These corrections are separately computed and applied to the signals transmitted to or received from each satellite 16 of the space segment 54 for each user.

Figure 6:
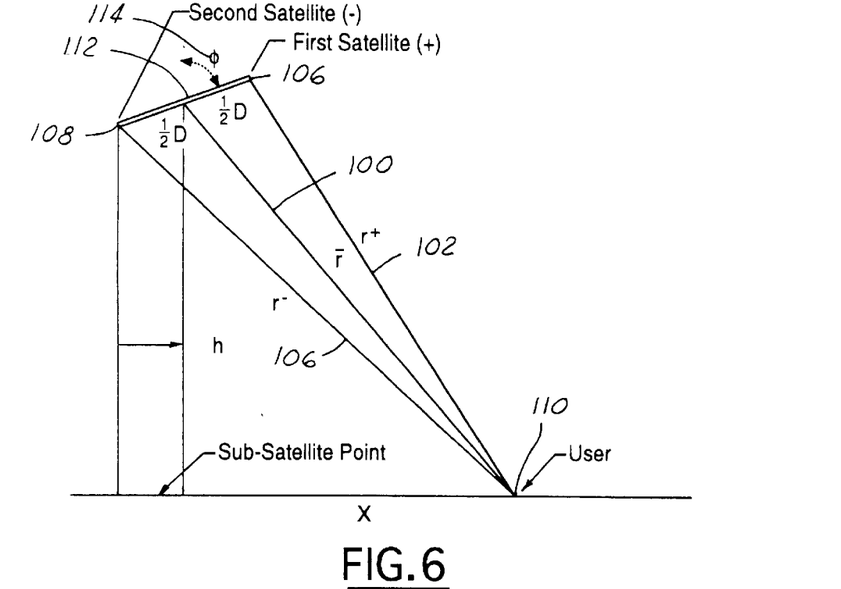
FIG. 6 is a schematic illustration of a multi-transponder wireless communication system illustrating signals being received coherently by their intended remote user.

FIG. 6 illustrates a multi-platform communication system 100 with improved frequency reuse efficiency in accordance with a preferred embodiment of the present invention. In particular, the system illustrated in FIG. 6 uses CDMA coding to subdivide the frequency resource among the various users. The system 100 enables a plurality of transponders 102, 104 to receive signals 106, 108 from the ground hub 110 and to transmit the signals 112, 114 at the same frequency with reduced interference to the intended user 116 from signals intended for other users. This is achieved by synchronizing the transmitted signals at the hub in such a way that the intended user 116 will receive all of the signals 112, 114 synchronously and completely in phase.

Based on the distances from the hub 110, to the various transponders 102, 104 and the distances between the transponders 102, 104 and the intended user 116, the appropriate compensating time delays are calculated and injected into each forward link message at the hub such that the intended user will coherently receive a combined signal from all the transponders as generally indicated at 118. The forward link to the intended user 116 follows the sequence of the hub 110 to the first transponder 102 to the user 116 (hub→trans 1→user 1) and also from the hub 110 to the second transponder 104 to the user 116 (hub→trans 2→user 1). Using the correct time delay on each forward link, all intended signals 112, 114 will arrive at the intended user 116 in phase. Conversely, the same signals intended for the intended user 116 will arrive out of phase at a non-intended user 120 and all other non-intended users in the area. This is shown in FIG. 7, which is described below.

Figure 7:
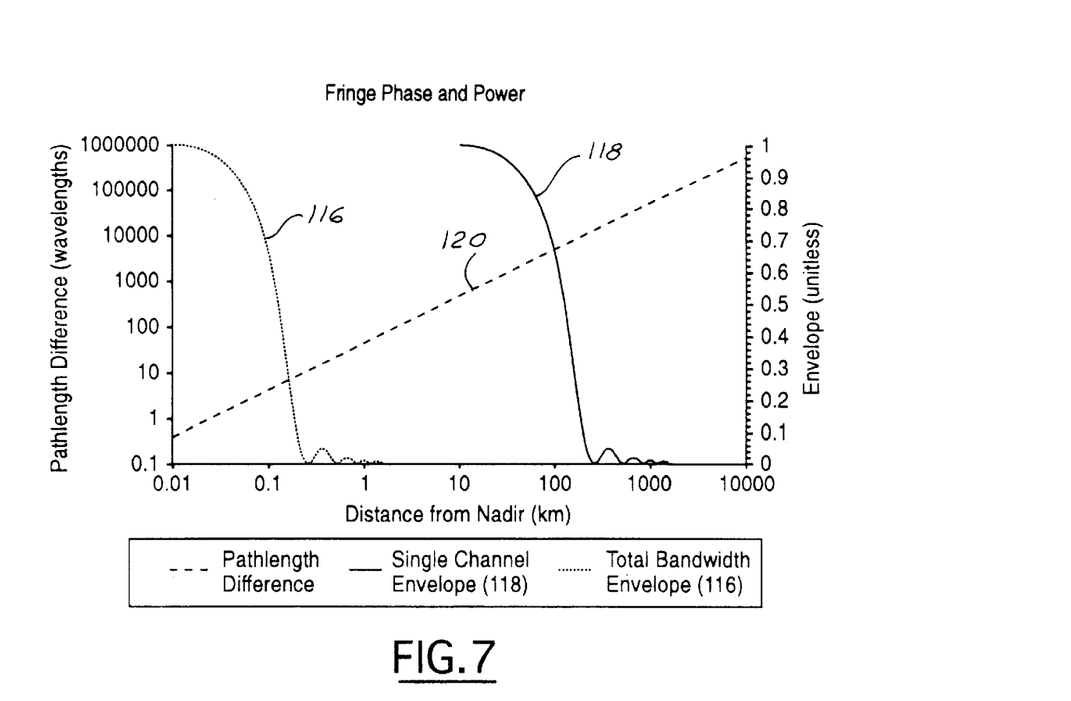
FIG. 7 is a schematic illustration of the multi-transponder wireless communication system of FIG. 6 illustrating the same signals being received incoherently by a remote non-intended user.

FIG. 7, illustrates the operation of the system of FIG. 6 with respect to the non-intended user 120. The distance between the hub 116 and the first transponder 102 and the distance between the first transponder 102 and the non-intended user 120 (hub→trans 1→user 2) and the distance between the hub 116 and the second transponder 104 and the distance between the second transponder 104 and the non-intended user 120 (hub→trans 2→user 2) are different in this case, even after compensation by the hub. Because of the distance differences, the signals 122, 124 will arrive at the non-intended user 120 at a different times and out-of-phase. The combined signal 126 will thus appear as noise and can be rejected as such by the terminal of the non-intended user 120.

It should be understood that the transponders 102, 104 can be part of any type of wireless communication system or can even be selected from several such systems. For example, while a space based system using satellites is illustrated, regional and national tower-based cellular networks for fixed and mobile communications may also be utilized. Additionally, any high altitude platform system, such as manned/unmanned airships, balloons, or airplanes may also be utilized. Further, while only two transponders are illustrated, an unlimited number of transponders may be utilized. Moreover, while the multiple transponders are shown as being part of a unitary system, any combination of transponders can be used to transmit signals in accordance with the present invention. For example, a signal may be transmitted to a user through both a space-based system and a high altitude platform system. Finally, different sets of transponders may be used to communicate with different users. These various sets may overlap in whole, in part or not at all.

Figure 8:
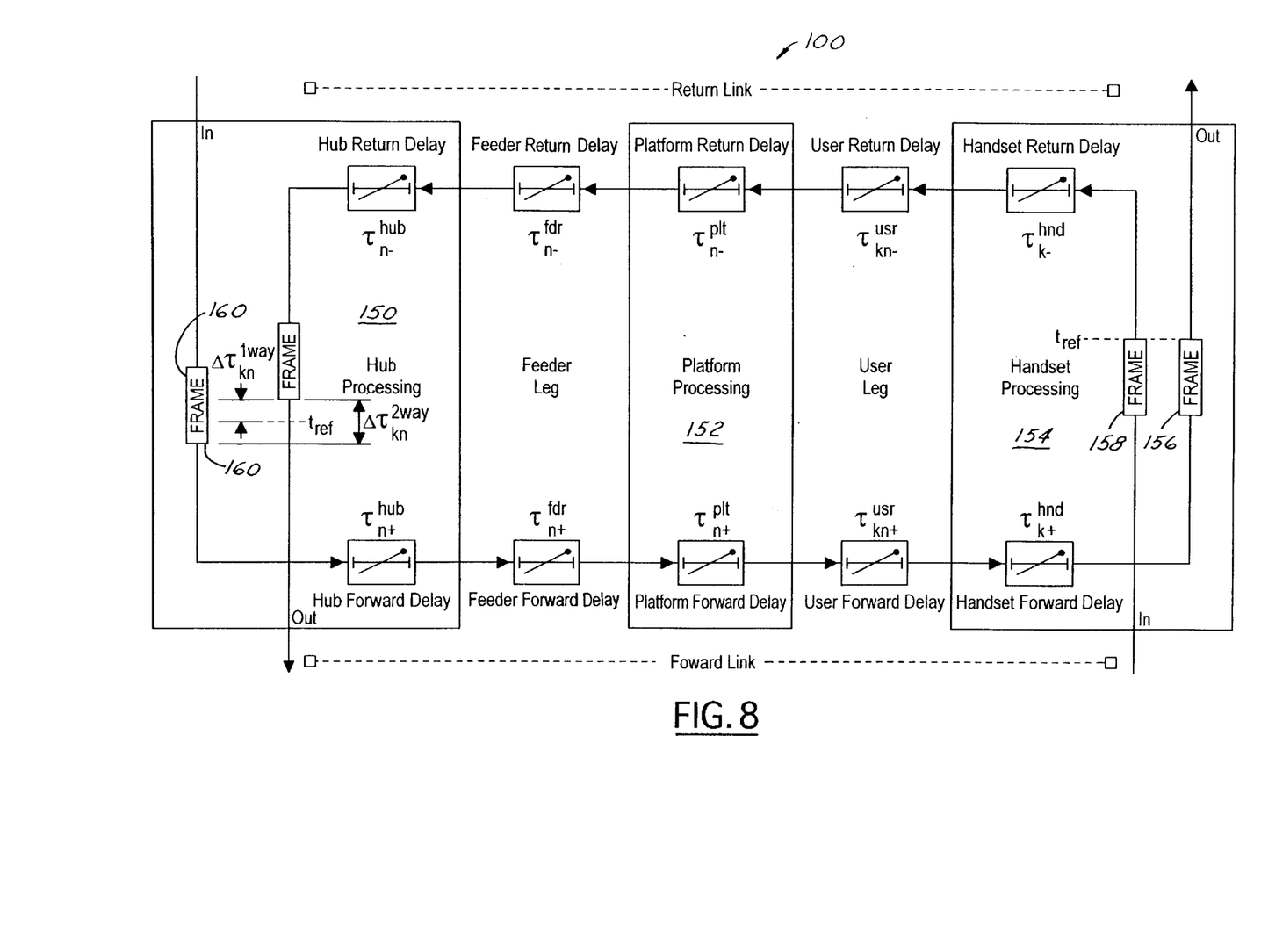
FIG. 8 is a schematic illustration of a signal flow emphasizing processing and transmission delays for a multiple platform system in accordance with a preferred embodiment of the present invention.

The system 100 of the preferred embodiment utilizes a synchronization technique employing CDMA encoding of the data. The CDMA encoding system is preferably asynchronous and utilizes embedded time delays as described in co-pending patent application Ser. No. 09/550,505, filed on Apr. 17, 2000 (Docket No. PD-990185), and entitled, "Coherent Synchronization of Code Division Multiple Access Signals", which is hereby incorporated by reference. The signal flows and relevant delays are illustrated in FIG. 8 for the forward and return links connecting a particular user 116 to the central hub 110 through a single platform or transponder 102, 104.

The synchronization of the system 100 is performed on two distinct levels. First, the timing of the PN encoded waveform is synchronized to within a fraction of a chip. Secondly, the carrier phase is synchronized to within a fraction of a wavelength. Both levels of synchronization must be achieved for the signals received by both the user terminal (forward link) and the central hub (return link) via each of the various platforms 102, 104 comprising the system 100. As discussed above, any number of transponders selected from multiple platforms may be utilized. These considerations distinguish a set of four synchronization operations that are preferably performed in the disclosed system 100 using CDMA data encoding. This synchronization is preferably accomplished with only minimal processing requirements being imposed on the user terminals 116 and/or transponder platforms 102, 104.

The first level of synchronization requires synchronizing the relative arrival time of the PN encoded data to within a fraction of a chip on both the forward and return links. Referring to FIG. 8, the signal timing in the central hub processor and user handset are related as follows:

$$t_{kn\pm}^{hub} = t_{k\pm}^{usr} \pm (\tau_{k\pm}^{hnd} + \tau_{kn\pm}^{usr} + \tau_{n\pm}^{plt} + \tau_{n\pm}^{fdr} + \tau_{n\pm}^{hub})$$

where $t_{kn\pm}^{hub}$ is the time at the central hub processor at which the forward (return) signal is transmitted (received) on the forward (return) link connecting the hub to user k and via platform n (sec);

$t_{k\pm}^{usr}$ is the time at which the forward (return) signal is received (transmitted) by user k (sec);

$\tau_{k\pm}^{hnd}$ is the delay encountered in the handset receiver (transmitter) belonging to user k between the point at which time is measured in the handset receiver (transmitter) and the coupling of the handset forward (return) signal from the medium by the handset antenna (sec);

$\tau_{kn\pm}^{usr}$ is the propagation delay encountered by the forward (return) signal on the user leg between the handset of user k and platform n (sec);

$\tau_{n\pm}^{plt}$ is the delay encountered by the forward (return) signal in the transponder of platform n (sec);

$\tau_{n\pm}^{fdr}$ is the propagation delay encountered by the forward (return) signal on the feeder leg between platform n and the hub (sec); and $\tau_{n\pm}^{hub}$ is the delay encountered by the forward (return) signal received from platform n in the hub transmitter (receiver) between the antenna and the point at which time is measured (sec).

The forward and return links are distinguished in the notation of the variables above by the use of the plus or minus sign, respectively. Furthermore, the forward link is characterized above by the use of the upper signs in the above relation, whereas the return link is characterized by the use of the lower signs.

The timing relationship set forth above is fundamental to the synchronization of signals arriving at the central hub 110 and the user handsets 116 via multiple transponder platforms 102, 104. The calibration and synchronization of these signals requires the evaluation and control of the various parameters appearing in these equations. The dimensionality of the calibration and synchronization is preferably reduced based on the following four factors: processing delays, propagation delays, handset synchronization, and CDMA coding.

Regarding the first factor, processing delays, it is assumed that all of the processing delays in the central hub processor 150, located within the central hub 110, the platform processor 152, located within each of the transponder nodes 102, 104, and the user handset processor 154, located within each of the mobile terminals 116 are relatively stable on both the forward and return links. Accordingly, these parameters may be evaluated relatively infrequently as compared with the propagation delays.

Regarding propagation delays, it is assumed that the forward and return propagation delays are the same on the Hub Leg (return link) as on the User Leg (forward link). Although this may not be strictly true, it is true in an approximate sense. Furthermore, any differences will tend to be relatively small and slow-varying and can be estimated and compensated by standard procedures. This assumption will be realized by dropping the link direction indicator (i.e., the plus or minus signs) in the subscripts attached to the propagation delays.

Regarding handset synchronization, it is assumed that the user handset 116 synchronizes the data frames 156, 158 in its receiver and transmitter sections, respectively. This permits the hub processor 150 to estimate the two-way delay encountered by the signal, as will be described below. This assumption will be realized by dropping the direction indicator in the subscript attached to the time reference in the user handset.

Regarding CDMA coding, it is assumed that the CDMA coding used has a code period which is sufficiently long to avoid any possible range ambiguities due to path length differences between the central processor 150 and user 116 via the various transponder platforms 102, 104 in the system.

After incorporating the various assumptions outlined above, the preceding timing relations can be expressed as follows:

$$t_{kn\pm}^{hub} = t_k^{usr} \pm (\tau_{k\pm}^{fwd} + \tau_{kn}^{usr} + \tau_{n\pm}^{plt} + \tau_n^{fdr} + \tau_{n\pm}^{hub})$$

The first measurement available to the hub processor 150 concerns the arrival times of the same data frame 160 as transmitted by a specific user 116 via the various transponder platforms 102, 104. Such timing measurements may be accomplished by standard techniques (e.g., delay-locked loops) in the hub processor 150 prior to the combination of the data streams received from distinct platforms 102, 104. If the measured parameters are designated by tilde ornaments, these measurements may be related to the above timing model as follows:

$$\tilde{t}_{kn-}^{hub} = t_k^{usr} + \tau_{k-}^{fwd} + \tau_{kn}^{usr} + \tau_{n-}^{plt} + \tau_n^{fdr} + \tau_{n-}^{hub}$$

This equation, by itself, is sufficient for the synchronization of the return link signals at the chip level. In particular, a variable delay needs only to be incorporated into the hub return processing whose magnitude is given by:

$$\Delta\tau_{kn-}^{hub} = (\text{Max}_n \tilde{t}_{kn-}^{hub}) - \tilde{t}_{kn-}^{hub}$$

$$\hat{t}_{k-}^{hub} = \tilde{t}_{kn-}^{hub} + \Delta\tau_{kn-}^{hub} = \text{Max}_n \tilde{t}_{kn-}^{hub}$$

Where $\Delta\tau_{kn-}^{hub}$ represents the additional delay inserted into the hub processing of the return received from user k through platform n (sec); and
$\hat{t}_{k-}^{hub}$ represents the timing of the synchronized return signal in the hub processor 150 from user k (sec).

Since the corrected signal arrival time does not depend on the particular transponder platform 102, 104 that relayed the signal, the required synchronization of the return signal has been accomplished. Furthermore, the inserted delays are all positive. In accordance with the present invention, it is not required to synchronize one user with respect to another.

The chip-level synchronization of the forward link signals arriving at the position of a particular user via the various transponder platforms 102, 104 is now discussed. This synchronization is impeded by the fact that the forward link signals received by the user handset 118 are not immediately accessible to the central processing hub 110 for analysis. It is also impeded by the fact that the user handset 118 sees only the sum of the signals transmitted from the central hub 110 via the various platforms 102, 104. Consider the mean of the origination time of the forward link signal and the reception time of the return link signal. If both signals correspond to the same frame time in the user handset (realizing that the handset synchronizes the return and forward link frames 156, 158), then the time delays due to the propagation path are eliminated from the mean. The remaining terms are all attributable to processing delays in the hub 150, the platform 152, and the user handset 154. This is dependent upon the assumption that the forward and return path delays are equivalent, as previously discussed. The average time is given by $$\bar{t}_{kn}^{proc} = \frac{1}{2}(\tilde{t}_{kn-}^{hub} + \tilde{t}_{kn+}^{hub})$$

$$= t_k^{usr} + \frac{1}{2}(\tau_{k-}^{fwd} - \tau_{k+}^{fwd}) + \frac{1}{2}(\tau_{n-}^{plt} - \tau_{n+}^{plt}) + \frac{1}{2}(\tau_{n-}^{hub} - \tau_{n+}^{hub})$$

where $\bar{t}_{kn}^{proc}$ is the average synchronization time for the forward and return links for a particular user and transponding platform (sec).

The remaining terms in the average time are independent of the user position. Furthermore, timing differences between different users is not critical to the disclosed process since user to user synchronization is not required.

Since the dependence of the average time on the particular user involved is not relevant to the synchronization problem, it is sufficient to measure the above average time by using a dedicated user handset, or beacon. The beacon is assigned a dedicated communication link, which may operate at a reduced power level as compared with the links assigned to other users. Furthermore, the central processing hub 110 transmits signals to this beacon through only one platform 102, 104 at a time. In this case, the hub 110 does not need to synchronize the arrival times of the signals at the handset, and can measure the average time directly:

$$\bar{t}_{k_o n}^{proc} = t_{k_o}^{usr} + \frac{1}{2}(\tau_{k_o}^{fwd} - \tau_{k_o+}^{fwd}) + \frac{1}{2}(\tau_{n-}^{plt} - \tau_{n+}^{plt}) + \frac{1}{2}(\tau_{n-}^{hub} - \tau_{n+}^{hub})$$

where
$k_O$ refers specifically to the beacon user.

The time at which the central processing hub 110 transmits a signal to user k via platform n may then be constructed as follows:

$$\bar{t}_{kn}^{proc} = \frac{1}{2}(t_{kn+}^{hub} + t_{kn-}^{hub})$$

$$= t_k^{usr} + \frac{1}{2}(\tau_{k-}^{fwd} - \tau_{k+}^{fwd}) + \frac{1}{2}(\tau_{n-}^{plt} - \tau_{n+}^{plt}) + \frac{1}{2}(\tau_{n-}^{hub} - \tau_{n+}^{hub})$$

$$= \bar{t}_{k_o n}^{proc} + (t_k^{usr} - t_{k_o}^{usr}) + \frac{1}{2}(\tau_{k-}^{fwd} \tau_{k_o-}^{fwd} - \tau_{k+}^{fwd} + \tau_{k_o+}^{fwd})$$

$$t_{kn+}^{hub} = 2\bar{t}_{k_o n}^{proc} - t_{kn-}^{hub} [2(t_k^{usr} - t_{k_o}^{usr}) + (\tau_{k-}^{fwd} \tau_{k_o-}^{fwd} - \tau_{k+}^{fwd} + \tau_{k_o+}^{fwd})]$$

Notice that the terms in square brackets depend only on the particular user whose signals are being calibrated and, in particular, are independent of the transponding platform through which the signals are relayed. Therefore, it is sufficient for the hub 110 to transmit the signal intended for user k via platform n at a hub time given by the following:

$$\hat{t}_{kn}^{hub} = 2\bar{t}_{k_o n}^{proc} - \tilde{t}_{kn-}^{hub}$$

$$= 2\bar{t}_{k_o n}^{proc} + \Delta\tau_{kn-}^{hub} - \hat{t}_{k-}^{hub}$$

The power level assigned to the beacon depends on the number of platforms, each of which must be separately calibrated, and the frequency with which updates to the average time are required. The required update frequency, in turn, depends on the stability of the component processing delays in both the forward and return.

The considerations in the phase synchronization of the return and forward links are similar to those pertaining to the corresponding chip-level synchronization, as discussed above. The major difference derives from the temporal precision of the required corrections. As before, the case of the synchronization of the return link is the easiest, and will be considered first. The phase synchronization of the return link is accessible to standard techniques. However, a phase estimation and removal function must be added to the processing that would be performed on a signal due to a single user 116 and transmitted via a single platform 102, 104.

The phase synchronization of the forward link, on the other hand, unavoidably requires some commitment of capacity in order to avoid adding complexity to the user handset 116. In particular, it is required for the central hub processor 150 to probe the phase of the arriving signal at each user handset. Furthermore, it must also be able to distinguish the phases of signals arriving via each transponder platform. The preferred approach to the phase synchronization of the forward link that is described below dedicates one or more channels (i.e., pseudo-random code sequence) for this purpose. As with the beacon user used for the chip-level synchronization of the forward link, the communication channels assigned to phase synchronization of the forward link may be operated at a different power level than is used for user data. As with the beacon, this is determined based on the required update rates. Furthermore, it is possible to share the channels used for phase calibration of the forward link with broadcast data from the hub 110 to the user community at large.

The requirement to probe the phase of the signal arriving at the position of a given user separately for each transponder platform 102, 104 requires that each user see only one calibration signal at any given time. This may be achieved in a number of ways; the specific method chosen will depend on available resources, such as beamforming capability. Some examples of various methods are set forth below.

Global The simplest technique is to simply transmit the calibration signal through only one transponder platform at any one time. The hub would cycle among the transponder platforms and collect and tabulate the phase data returned by each user for each platform. The disadvantage of this approach is power allocated to the calibration channel on the transponder platforms not being calibrated would not be easily re-allocated to other uses.

Multi-Channel One approach to improving the efficiency of the Global approach described above is to assign separate channels (CDMA codes) to each transponder platform for purposes of phase calibration of the forward link. This would solve the main problem of the above approach, which is the inactivity of the calibration channel for all but one transponder platform at any particular time. The cost is that the user handset would be required to simultaneously process calibration signals from multiple transponder platforms, as well as the information-bearing communication link. Furthermore, all of this data would have to be returned to the central hub for processing and application to the transmitted signal. In addition, this cost will grow in proportion to the number of transponder platforms.

Multi-Cell If the system provides spatial diversity through a set of fixed spot beams (cells) which collectively illuminate the entire coverage area, then different transponder platforms may be selected for synchronization in each beam. This would equalize the power devoted to phase calibration of the forward link by each transponder platform. However, there is still a potential disadvantage, which results from the fact that spot beams generally overlap somewhat. This fact requires that only one in four beams be illuminated by the calibration channel at any one time in a four color pattern. The hub would cycle the transponder platform assigned to each spot beam among the various platforms and the inactive state and, as above, would collect and tabulate the results by user and transponder platform for each beam.

Multi-Color The need for inactive spot beams in the preceding approach can be avoided by increasing the number of channels assigned to the phase calibration of the forward link. In particular, one channel could be assigned to each color in the four color pattern. The cost of adopting this approach is that the available code space for communication is reduced (probably minor) and the complexity of the user handset is increased, since now four calibration channels must be processed simultaneously. Note that temporal, frequency and/or polarization diversity resources may be applied to accomplish the same function as described here.

Scanning If the system offers a capability for flexible beam formation, then one could form a single beam for each platform. These beams would be made as large as possible while avoiding any interference with adjacent beams formed by other platforms. Finally, the beams would be gradually scanned across the coverage area so that any particular user would be cyclically illuminated by the beam formed by each platform. One possible way of arranging these beams would be as strips. However, other arrangements are also possible. Note that the gaps between the beams in this approach need not be of the same size as the beams themselves. Of course, the gaps could be completely eliminated by utilizing one or more additional channels for phase calibration. This could be viewed as a variant of the Multi-Color approach described above.

Regardless of the particular approach adopted for the forward link calibration, the user handset must receive the calibration signal, measure its phase and return the results to the central processing hub for further processing. The hub 110 preferably then applies the results to the transmitted signal. In accordance with the preferred embodiment, this is done by multiplexing the forward link phase data onto the user return link data.

The above described techniques for phase calibration of the forward link all involve the broadcast of calibration data over one or more calibration channels. The user handset 116 measures the received phase of each data symbol received on these calibration channels, averages the results over some period of time and returns the result multiplexed onto its return link data stream. If the precision of the returned phase calibration data word is matched to the uncertainty of the average phase determination, then a relationship is established between the rate at which calibration data is returned and its precision. In particular, one has $$\sigma_{cal} = \frac{\sigma_{meas}}{\sqrt{\eta_{cal} N_{cal} N_{chan}}} = \frac{2\pi}{2^{N_{bits}}}$$

where $\sigma_{cal}$ is the precision of the average phase calibration data returned by the handset to the central hub (rad);

$\sigma_{meas}$ is the precision of the phase measurement determined by the handset from a single received data symbol on one of the calibration channels (rad);

$\eta_{cal}$ is the fraction of data symbols on the calibration channels usable for phase calibration purposes (unitless);

$N_{cal}$ is the interval between returned average phase calibration data values on the return link (symbols);

$N_{chan}$ is the number of channels allocated to the phase calibration of the forward link;

and $N_{bits}$ is the length of the returned average phase calibration data word (symbols).

The center value in this expression estimates the precision of the averaged phase data, and the final value gives the precision of the calibration data returned to the hub. The interval between updates to the forward link phase for a particular platform and user may then be expressed as $$N_{upd} = N_{plat} N_{cal} = \frac{4^{N_{bits}} N_{plat}}{\eta_{cal} N_{chan}} \left(\frac{\sigma_{meas}}{2\pi}\right)^2$$

where $N_{upd}$ is the interval between updates to the forward link phase for a particular platform and user (symbols);
and
$N_{plat}$ is the number of transponder platforms.

The update rate, in turn, places constraints on the rate at which the phase is allowed to change or, equivalently, on the dynamics of the user and transponder motion. If the phase calibration update rate is held constant, then the overhead cost of returning the phase calibration data on the return link increases with the number of platforms:

$$\rho_{cal} = \frac{N_{bits}}{N_{cal}} = \frac{N_{bits} N_{plat}}{N_{upd}} = \frac{N_{plat}}{2 N_{upd}} \log_2 \left[ \frac{\eta_{cal} N_{chan} N_{upd}}{N_{plat}} \left(\frac{\sigma_{meas}}{2\pi}\right)^{-2} \right]$$

where $\rho_{cal}$ is the fractional overhead cost of returning the phase calibration data on the return link.

Regarding the required update rate for the forward link phase applied by the hub to the transmitted signal, it is possible to significantly reduce this rate by making use of the information contained in the phases of the return link signals, which are directly measured by the hub processor 150. This can be seen by expressing the signal phase as follows:

$$\phi_\pm = \tau v_\pm$$

where $\phi_\pm$ is the signal phase for either the forward (+) or return (−) link at the hub when the signals transmitted through all platforms are in phase at the user handset (cycles);

$v_\pm$ is the RF frequency of the forward (+) or return (−) link (Hz);

and $\tau$ is the propagation delay, which is assumed to be the same for both the forward and return links (sec).

If the phases of the forward and return link signals are determined at some point in time by techniques such as those discussed above, then the uncertainty of the phase correction will grow with time following the measurement:

$$\sigma_{\phi_\pm} = \sigma_\tau v_\pm = \left[ \sum_n \left(\frac{1}{n!} \sigma_{\tau^{(n)}} \delta \, t^n\right)^2 \right]^{\frac{1}{2}} v_\pm$$

where $\sigma_{\phi_\pm}$ is the uncertainty in the signal phase (cycles);

$\sigma_\tau$ is the uncertainty in the estimated propagation time (sec);

$\delta t$ is the elapsed time since the last update to the phase (sec);

$\tau^{(n)}$ is the $n^{th}$ derivative of the propagation time evaluated at the last update time (sec);

and $\sigma_{\tau^{(n)}}$ is the uncertainty of the nth derivative of the propagation time evaluated at the last update time (sec).

The uncertainty in the propagation time, which appears in the above expression, will result primarily from uncertainties in the motion of the user and/or platforms.

If instead the phase difference between the forward and return links is considered, the following equation results:

$$\sigma_{\Delta\phi} = \sigma_\tau |\Delta v|$$

where $\sigma_{\Delta\phi}$ is the uncertainty of the phase difference estimate between the forward and return links (Hz);
and
$\Delta v$ is the frequency difference between the forward and return links (Hz), given by $$\Delta v = v_+ - v_-$$

If, however, the frequency difference between the forward and return links is small compared with the return and forward link RF frequencies, then the uncertainty in the propagation delay can be allowed to grow larger for the same phase uncertainty. It is assumed that the phase of the return link is updated much more frequently, resulting in a negligible contribution of the return link phase uncertainty to the estimated phase of the forward link.

Having now fully described the invention, it will be apparent to one of ordinary skill in the art that many changes and modifications can be made thereto without departing from the spirit or scope of the invention as set forth herein.

What is claimed is:

1. A method for synchronizing a plurality of user signals such that each of the plurality of user signals arrives in-phase at the location of an intended recipient, comprising:

providing a plurality of individual transponding nodes;

providing a plurality of mobile users each having a respective mobile terminal;

establishing a link between at least one of said plurality of mobile terminals and a ground hub through one or more of said plurality of transponding nodes;

transmitting one or more of said plurality of user signals to and from said central hub;

synchronizing a relative arrival time of PN encoded data contained in said one or more of said plurality of user signals to within a fraction of a chip in both a forward link and a return link; and synchronizing a carrier phase of said one or more of said plurality of user signals to within a fraction of a wavelength in both said forward and return links.

2. The method of claim 1, wherein said relative arrival time of said user signals are related according to the following equation:

$$t_{kn\pm}^{hub} = t_{k\pm}^{usr} \pm (\tau_{k\pm}^{hnd} + \tau_{kn\pm}^{usr} + \tau_{n\pm}^{plt} + \tau_{n\pm}^{fdr} + \tau_{n\pm}^{hub}).$$

3. The method of claim 2, further comprising:
measuring said arrival times of the same data frame as transmitted by one of said plurality of mobile users via one or more of said plurality of transponding nodes.

4. The method of claim 3, wherein said measured arrival times are related to the time at which said data frame was sent by said user mobile terminal as follows:

$$t_{kn-}^{hub} = t_k^{usr} + \tau_{k-}^{hnd} + \tau_{kn}^{usr} + \tau_{n-}^{plt} + \tau_n^{fdr} + \tau_{n-}^{hub}.$$

5. The method of claim 4, further comprising:
inserting a variable delay into said return link signals by said ground hub.

6. The method of claim 5, further comprising:
determining the magnitude of said return link signal variable delay according to the following:

$$\Delta \tau_{kn-}^{hub} = \left(\text{Max}_n \tilde{t}_{kn-}^{hub}\right) - \tilde{t}_{kn-}^{hub}$$

$$\hat{t}_{k-}^{hub} = t_{kn-}^{hub} + \Delta \tau_{kn-}^{hub} = \text{Max}_n \tilde{t}_{kn-}^{hub}.$$

7. The method of claim 2, further comprising:
   determining any processing delay between said forward link signals and said return link signals.

8. The method of claim 1, wherein said synchronizing said carrier phase in said return link further comprises adding a phase estimation and removal function to the processing of said one or more of said plurality of user signals.

9. The method of claim 1, wherein said synchronizing said carrier phase in said forward link includes transmitting a calibration signal to one or more of said plurality of mobile users, measuring its phase, and returning the measured results to said ground hub.

10. The method of claim 1, wherein each of said plurality of individual transponding nodes is independently selected from one of the following system types: a space-based system, a high altitude platform system, or a tower based cellular network.

11. A multi-platform mobile wireless communication system, comprising:
   a plurality of individual transponding nodes each having a platform processor;
   a plurality of mobile terminals each having a handset processor;
   a central hub for establishing links with one or more of said plurality of mobile terminals and for synchronizing one or more associated user signals in both forward links and return links through one or more of said plurality of transponding platforms;
   a central hub processor associated with said central hub for synchronizing the timing of PN encoded waveforms and the associated carrier phases of a user signal received or transmitted through one or more transponding platforms.

12. The system of claim 11, wherein the timing of said PN encoded waveform is synchronized to within a fraction of a chip.

13. The system of claim 12, wherein said carrier phase is synchronized to within a fraction of a wavelength.

14. The system of claim 13, wherein the timing of said PN encoded waveforms is synchronized in accordance with the following:

$$t_{kn\pm}^{hub} = t_{k\pm}^{usr} \pm (\tau_{k\pm}^{hnd} + \tau_{kn\pm}^{usr} + \tau_{n\pm}^{plt} + \tau_{n\pm}^{fdr} + \tau_{n\pm}^{hub}).$$

15. The system of claim 14, wherein said central hub processor incorporates a variable delay into said return link signals for synchronization, the magnitude of which is determined in accordance with the following:

$$\Delta \tau_{kn-}^{hub} = \left(\text{Max}_n \tilde{t}_{kn-}^{hub}\right) - \tilde{t}_{kn-}^{hub}$$

$$\hat{t}_{k-}^{hub} = t_{kn-}^{hub} + \Delta \tau_{kn-}^{hub} = \text{Max}_n \tilde{t}_{kn-}^{hub}.$$

16. The system of claim 14, wherein for transmission of said forward link signals, said central hub processor determines a difference between the original time of said forward link signal and the reception time of said return link signal in accordance with the following:

$$\tilde{t}_{k_0 n}^{proc} = t_{k_0}^{usr} + \frac{1}{2}(\tau_{k_0-}^{hnd} - \tau_{k_0+}^{hnd}) + \frac{1}{2}(\tau_{n-}^{plt} - \tau_{n+}^{plt}) + \frac{1}{2}(\tau_{n-}^{hub} - \tau_{n+}^{hub}).$$

17. The system of claim 16, wherein said forward link signals are synchronized by said central hub processor in accordance with the following:

$$\hat{t}_{kn}^{hub} = 2\tilde{t}_{k_0 n}^{proc} - \hat{t}_{kn-}^{hub}$$

$$= 2\tilde{t}_{k_0 n}^{proc} + \Delta \tau_{kn-}^{hub} - \hat{t}_{k-}^{hub}.$$

18. The system of claim 13, wherein during the synchronization of the carrier phase in said forward link, said central hub processor probes the phase of said user signals and distinguishes the phases of said signals arriving at the user terminal via each of said plurality of transponder nodes.

19. The system of claim 18, wherein said central hub processor probes the phase of said signal arriving at a given mobile terminal in accordance with one of the following methods: global, multi-channel, multi-cell, multi-color, or scanning.

20. A method for receiving and transmitting user signals in both a forward link and a return link in a mobile wireless communication system, comprising:
   providing a plurality of individual transponding nodes each having a platform processor;
   providing a plurality of mobile terminals each having a handset processor;
   establishing links between a central hub and one or more of said plurality of mobile terminals through one or more of said plurality of transponding nodes;
   processing a plurality of signals at said central hub for both said forward link and said return link;
   processing said forward link signals such that the timing of a PN encoded waveform is synchronized and such that a phase of one or more of a plurality of user signals is probed; and
   processing said return link signals such that the carrier phase is synchronized.

* * * * *